United States Patent
Laviec et al.

(10) Patent No.: US 6,618,449 B1
(45) Date of Patent: Sep. 9, 2003

(54) RECEIVER FOR A FREQUENCY-SHIFT-KEYING, CONTINUOUS-WAVE RADAR

(75) Inventors: Philippe Laviec, Plougastel Daoulas (FR); Pascal Cornic, Saint Renan (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/256,214

(22) Filed: Feb. 24, 1999

(30) Foreign Application Priority Data

Mar. 3, 1998 (FR) .............................................. 98 02540

(51) Int. Cl.[7] .............................. H03D 3/00; H04L 27/14
(52) U.S. Cl. ...................... 375/335; 375/334; 375/272; 375/275; 329/300
(58) Field of Search ................................ 375/334, 335, 375/337, 272, 275, 219; 329/300, 301, 302, 303; 455/73, 84

(56) References Cited

U.S. PATENT DOCUMENTS

| 5,220,557 | A | * | 6/1993 | Kelley | ........................ 370/345 |
| 5,420,591 | A | | 5/1995 | Annee et al. | |
| 5,504,490 | A | | 4/1996 | Brendle et al. | |
| 5,598,163 | A | | 1/1997 | Cornic et al. | |
| 5,646,623 | A | | 7/1997 | Walters et al. | |
| 5,732,107 | A | * | 3/1998 | Phillips et al. | .............. 375/296 |
| 6,023,238 | A | * | 2/2000 | Cornic et al. | ................ 342/129 |

FOREIGN PATENT DOCUMENTS

GB  2 249 448 A  5/1992

\* cited by examiner

*Primary Examiner*—Phoung Phu
(74) *Attorney, Agent, or Firm*—Oblon, Spivak, McClelland, Maier & Neustadt, P.C.

(57) ABSTRACT

A receiver of a frequency-shift-keying, continuous-wave radar comprises at least sampling means taking real samples of the signals in each reception channel and extrapolation means, the extrapolation means producing fictitious samples synchronous with the real samples, the reception signals being formed out of real samples and fictitious samples. Application especially to radars fitted into automobiles.

33 Claims, 7 Drawing Sheets

RECEIVER FOR A FREQUENCY-SHIFT-KEYING, CONTINUOUS-WAVE RADAR

BACKGROUND OF THE INVENTION

The present invention relates to a a frequency-shift-keying continuous-wave radar. It can be applied especially to radars equipping automobiles and more generally radars requiring low manufacturing cost.

A frequency-shift-keying, continuous-wave radar can transmit in several frequencies, for example four or even more frequencies. A radar of this kind may be fitted for example into an automotive cruise control or ACC type function. A radar of this type is designed to enable the regulation of the behavior, namely the acceleration, speed and braking, of automobiles. It detects and localizes the closest vehicle located in the path of the carrier vehicle. The information, especially information pertaining to distance, is transmitted for example to a computer which acts, through appropriate interfaces, on the control of the engine so as to regulate the distance between the vehicle and its predecessor.

A radar designed to equip an automobile, which is a mass consumer product, has to be low in cost. This low cost is achieved if all the components of the radar are obtained, economically. It is necessary in particular to obtain a low-cost receiver. This goal may be achieved especially by the use of a digital receiver having few components. For this purpose, it is judicious to use only one encoder for the digital conversion of the reception signal. In a frequency-shift-keying receiver, the distance D from the radar to a target may be given by the following relationship:

$$\Delta\varphi = \frac{4\pi D}{c} \times \Delta F$$

where c is the velocity of light and $\Delta F$ and $\Delta\varphi$ respectively are the difference in frequency and the difference in phase between two successive signals.

The use of a single encoder for all the reception channels, one reception channel being associated with one frequency, implies that the operations of sampling the signals of the different reception channels can no longer be synchronous but, on the contrary, sequential. Now, the absence of synchronism between these signals causes the existence of an additional phase shift due to the Doppler effect which disturbs the measurement of distance. In fact, this effect may be corrected after fast Fourier transform operations, known as FFT operations, on the reception signals. However, again for reasons of ease of implementation and therefore of cost, it is preferable to perform the correction before the processing by FFT. Indeed, this averts the need, subsequently, to carry out a differentiated correction pertaining to each Doppler filter.

SUMMARY OF THE INVENTION

It is an aim of the invention in particular to enable this correction to be performed upline and therefore to enable the making of a economical receiver for a frequency-shift-keying continuous-wave radar for the detection of distances between moving objects, this receiver being capable of working with a single encoder, by bringing into play the extrapolation of the sampled signals. To this end, an object of the invention is a receiver for a frequency-shift-keying continuous-wave radar transmitting in several frequencies and comprising several corresponding reception channels, wherein said receiver comprises at least sampling means taking real samples of the signals in each reception channel and extrapolation means, the extrapolation means producing fictitious samples synchronous with the real samples, the reception signals being formed out of real samples and fictitious samples.

The main advantages of the invention are that it improves the filtering of the reception signals, is adapted to any number of transmission frequencies, enables the information output rate and the sampling frequency to be made independent of each other, limits the dynamic range of the encoder, facilitates self-calibration, prevents temporal drifts and is simple to implement.

BRIEF DESCRIPTION OF THE DRAWINGS

Other features and advantages of the invention shall appear from the following description made with reference to the appended drawings, of which.

MORE DETAILED DESCRIPTION

Figure 1:
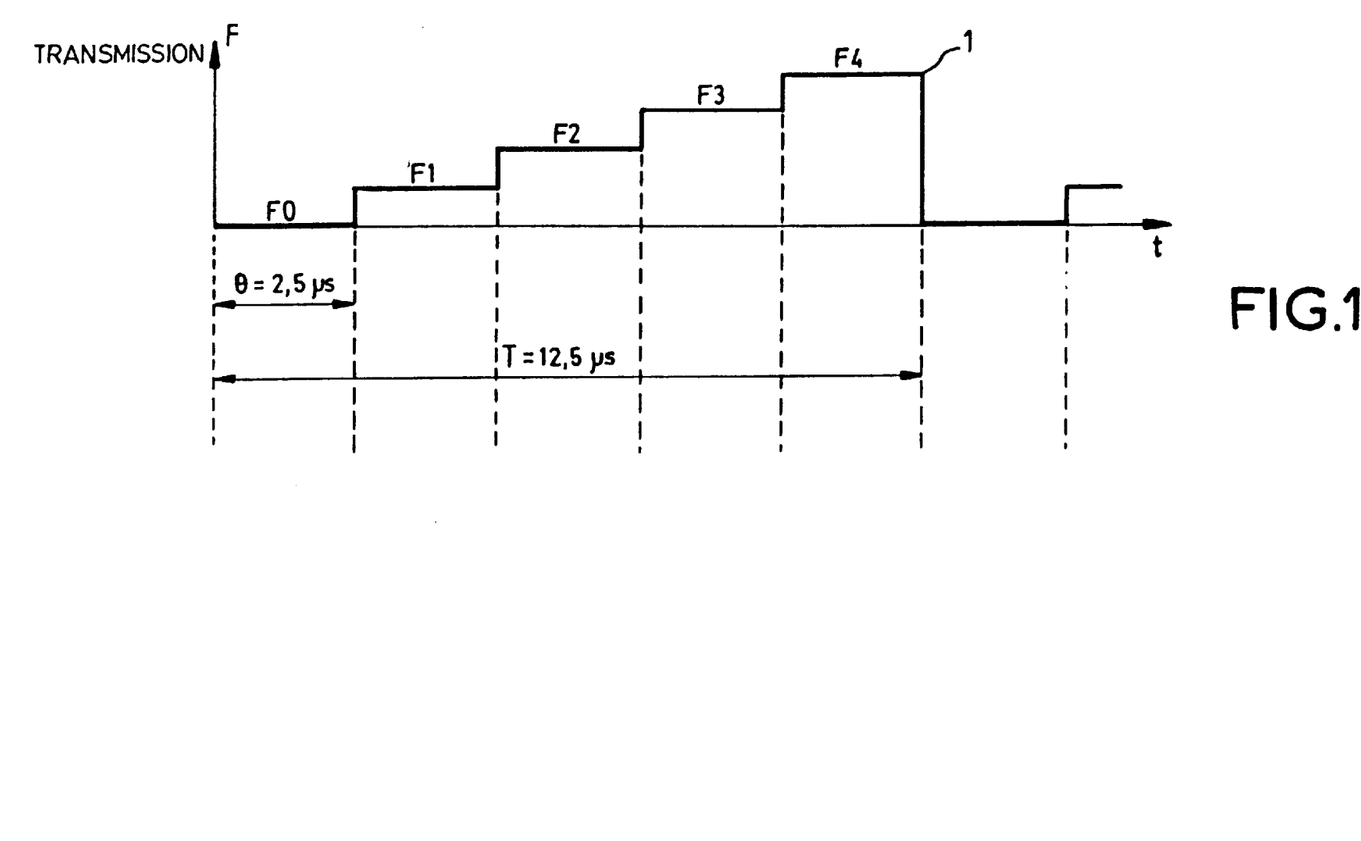
FIG. 1 shows an exemplary waveform at transmission for a continuous-wave frequency-shift-keying radar.

FIG. 1 gives a view, as a function of time, of an exemplary waveform 1 at transmission, for a frequency-shift-keying continuous-wave radar, in a case of the use, for example, of five frequencies, F0, F1, F2, F3, F4. For each radar processing recurrence, the radar successively carries out the transmission, during periods of time θ equal for example to 2.5 µs, of a signal at the first frequency F0 and then a signal at the second frequency F1 and so on and so forth until the fifth frequency F4. Then again for the next recurrence a signal is sent at the first frequency F0. The duration T of a transmission frame is thus equal for example to 12.5 µs. At reception, during the transmission of each frequency F0, F1, F2, F3, F4, the receiver remains open. The received signals are sampled after an adapted filtering as described hereinafter.

The five frequencies F0, F1, F2, F3, F4 may be referenced according to the following relationships:

$$F0 = F + k_0 v \quad (1)$$

$$F1 = F + k_1 v \quad (2)$$

$$F2 = F + k_2 v \quad (3)$$

$$F3 = F + k_3 v \quad (4)$$

$$F4 = F + k_4 v \quad (5)$$

where F is any frequency in the band of use of the radar, for example 76 to 77 GHz for an automobile radar, the coefficients $k_i$ are five different integers and $\nu$ represents a given frequency, for example equal to or in the range of 250 kHz.

The determining of the distance from a target and especially the removal of its ambiguity is done by processing on the signals received at the five frequencies, for example on the sum channel in the case of the use of a monopulse antenna. It requires especially the sampling and then the storage of the five reception signals of one and the same recurrence. In one implementation of a standard analog receiver, it is necessary then to provide for signal holding circuits, holding devices and five analog-digital encoders, in a case of use of five frequencies. Not only is such a solution costly in as much as it requires many components but it is furthermore difficult to develop and finalize since provision has to be made, in particular, for identical gain on the five channels as well as one and the same phase evolution and the same filtering characteristics.

Since an analog approach proves to be costly and difficult to implement, it is then possible to envisage a digital approach. A single analog-digital encoder is then enough and the signals may be stored by the digital circuits. A digital approach of this kind, while it enables economical construction, is nevertheless not free of drawbacks. In particular, whether it is a digital approach or an analog approach, the signals need to be sampled synchronously. This especially makes it necessary for the sampling of the reception signals to be done at the same point in time on all the frequency channels F0, F1, F2, F3, F4. Now, by construction, this synchronization cannot take place in an economical digital receiver using only one encoder since the signals that sent and received in these channels are sent and received sequentially. The need to carry out a synchronous sampling is dictated by the Doppler effect. Indeed, the phase rotation $\Delta\phi$ of the signal received, from one frequency to the next one, is given by the following relationship:

$$\Delta\varphi = \frac{4\pi D}{c} \times \Delta F \quad (6)$$

where D is, without taking the ambiguities into account, the distance from the radar to the target which is in fact the distance to be detected, c is the velocity of light and $\Delta F$ is the difference in frequency between two successive signals: if we refer to the foregoing relationships 1 to 5, $\Delta F$ is for example equal to $k_0\nu$, $k_1\nu$, $k_2\nu$, $k_3\nu$ or $k_4\nu$. The phase rotation $\Delta\phi$ is in fact the phase shift between two successive signals, it being known that two successive sampled signals are respectively at the frequencies Fi and Fi+1.

When there is no synchronization, as described here above, the phase rotation is given by the following relationships in which the Doppler frequency $F_d$ comes into play:

$$\Delta\varphi = \frac{4\pi D}{c} \times \Delta F + 2\pi f_d T_e \quad (7)$$

$T_e$ being the sampling period, $T_e$ is for example substantially equal to the above-mentioned duration of transmission.

It can therefore be seen that it is no longer possible to determine the distance D in a simple way, because of an uncontrolled parameter which is the Doppler frequency $F_d$. The phase rotation $\Delta\phi$ is obtained in practice by means of FFT modules which carry out fast Fourier transforms. The above relationship (7) shows therefore that there is then a correlation between these modules, more specifically their results, and the Doppler frequency of the received signals. This disturbs the measurement of distance.

Figure 2:
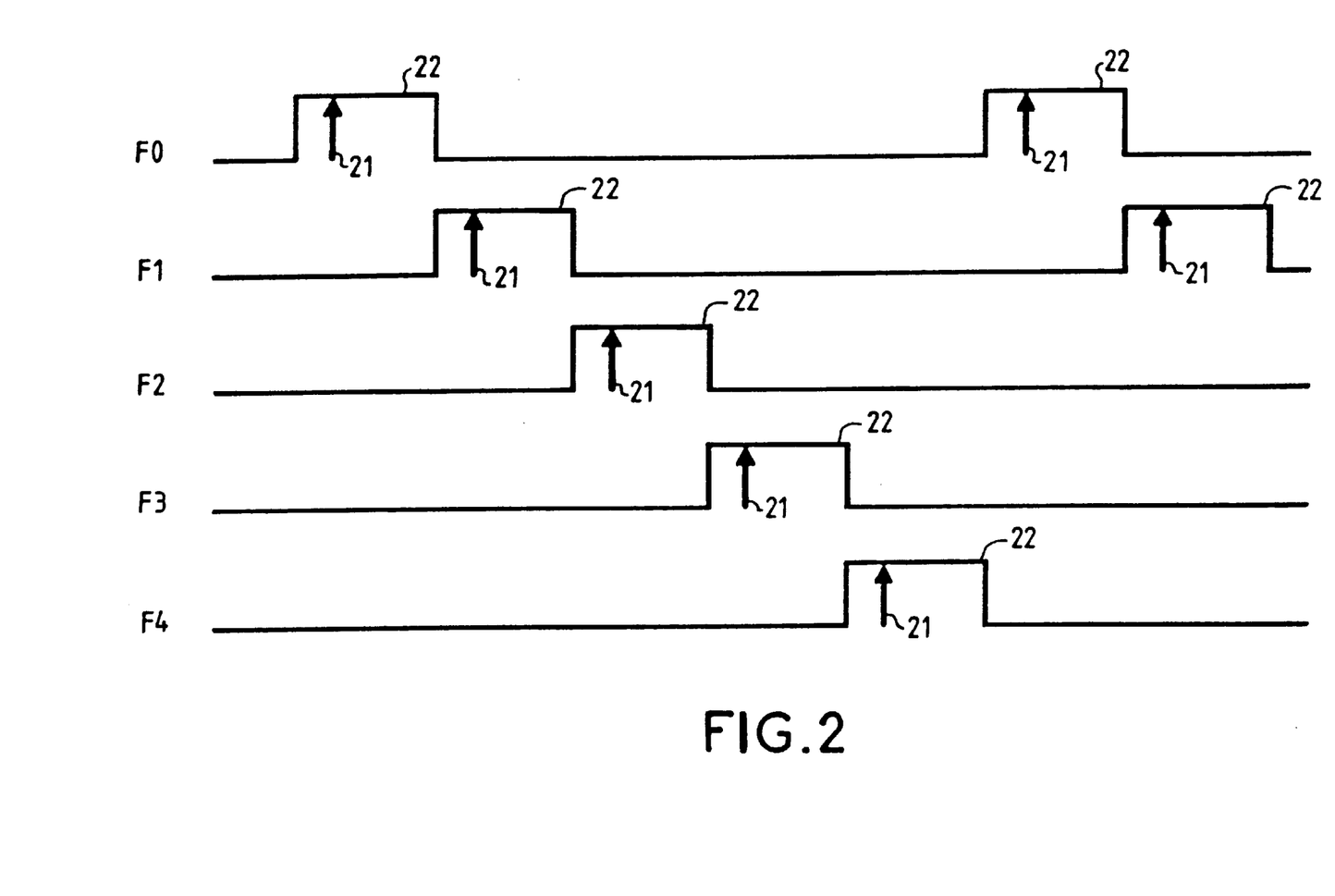
FIG. 2 shows the instants of sampling of the reception signals, symbolized by arrows, as a function of the intervals of frequencies used by the radar.
Figure 3:
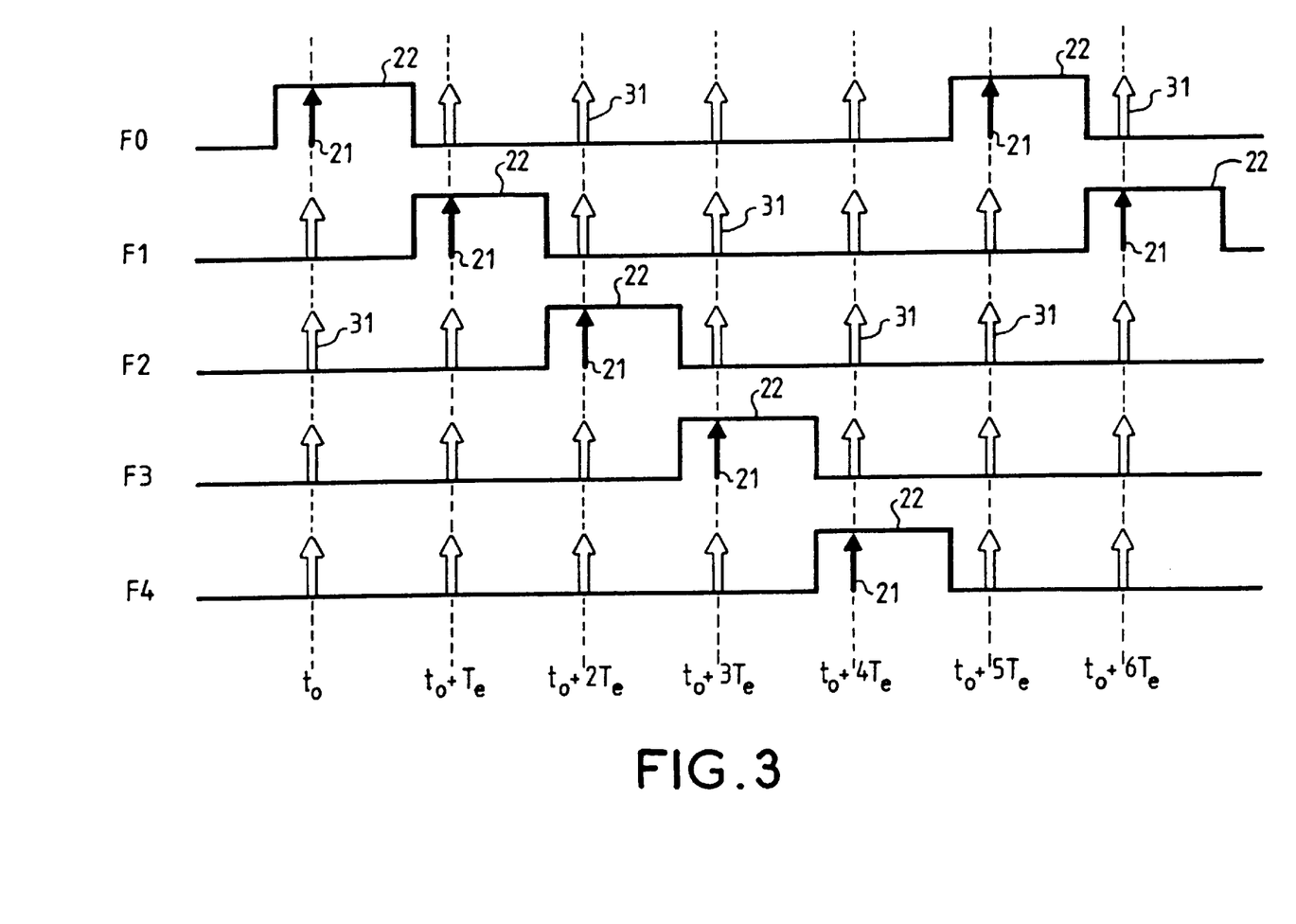
FIG. 3 shows fictitious samplings of the reception signals, represented by blank arrows, and fixedly linked to the real sampling instants.

FIGS. 2 and 3 illustrate the principle of operation of a digital receiver according to the invention which makes it possible in particular to overcome the problems of synchronization referred to here above, in the case for example of a radar using five frequencies. FIG. 2 shows the sampling instants, symbolized by arrows 21 in relation to the interval 22 for each of the frequencies F0, F1, F2, F3, F4. For a given recurrence, the values of the samples of the signals received, each pertaining to a frequency interval 22, are respectively referenced $A_0, A_1, A_2, A_3, A_4$, in relation to the frequencies F0, F1, F2, F3, F4. FIG. 3, in addition to the above-described samplings 22, shows fictitious samplings that are represented by blank arrows 31 and are fixedly linked to the real sampling operations 22. For each of the frequencies, these fictitious samplings 31 are done in the absence of any received signal corresponding to the frequency considered. These sampling operations are fictitious for they are not carried out on signals but correspond to fictitious values stored by the circuits of the digital receiver, more particularly by storage means. These values are any values and, possibly, they may be zero or constant for example so as to simulate a holding of the real sampled values, in being equal to the last real sampled value. Again, these fictitious samples may be determined by computation, for example by a first-order or second-order linear interpolation, with or without noise. The following table illustrates this sampling performed by a receiver according to the invention:

| F0 | $A_0$ | $a_{01}$ | $a_{02}$ | $a_{03}$ | $a_{04}$ | $A'_0$ | $a'_{01}$ |
| F1 | $a_{10}$ | $A_1$ | $a_{12}$ | $a_{13}$ | $a_{14}$ | $a'_{10}$ | $A'_1$ |
| F2 | $a_{20}$ | $a_{21}$ | $A_2$ | $a_{23}$ | $a_{24}$ | $a'_{20}$ | $a'_{21}$ |
| F3 | $a_{30}$ | $a_{31}$ | $a_{32}$ | $A_3$ | $a_{34}$ | $a'_{30}$ | $a'_{31}$ |
| F4 | $a_{40}$ | $a_{41}$ | $a_{42}$ | $a_{43}$ | $A_4$ | $a'_{40}$ | $a'_{41}$ |

Figure 4:
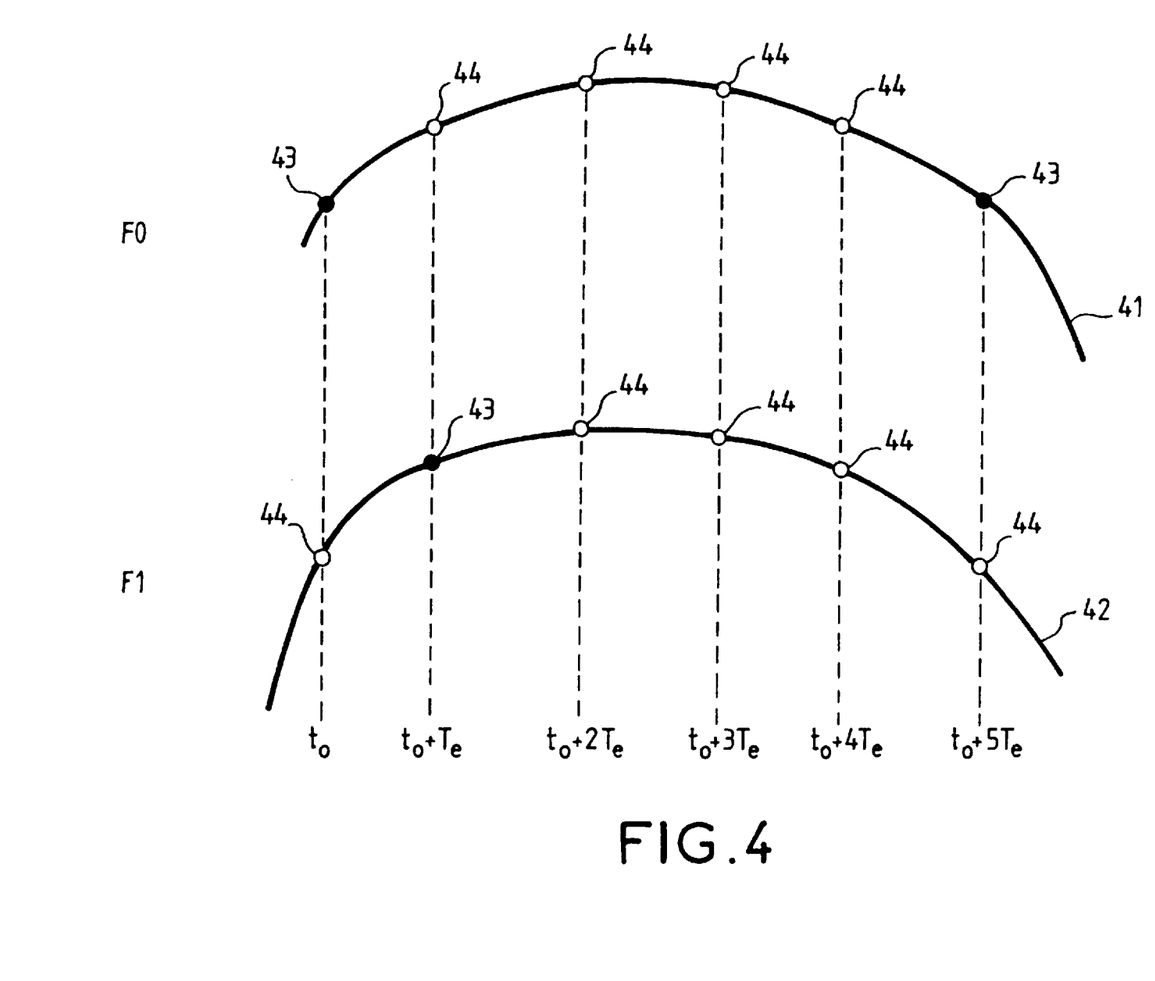
FIG. 4 gives an exemplary view of two signals pertaining respectively to two frequencies extrapolated in accordance with fictitious sampling operations.

Each line of this table, pertaining to a frequency Fi, represents the successive samples including the real sample $A_i$. The fictitious values $a_{ij}$ are memorized and then assigned to the sampling instants in such a way that, from the viewpoint of the signal reconstituted by the circuits of the receiver, all the values $A_i$, $a_{ki}$ of a column of the previous table are considered to be sampled at the same point in time. The values of the first column are sampled at an instant $t_0$, the following columns are sampled respectively at the instant $t_0+T_e$, $t_0+2T_e$, $t_0+3T_e$, $t_0+4T_e$, $t_0+5T_e$, $t_0+6T_e$ etc . . . $T_e$ being the sampling period. In other words, a receiver according to the invention comprises sampling means taking real samples $A_i$ of the signals in each reception channel and extrapolation means that produce fictitious samples $a_{ij}$ synchronous with the real samples, the reception of signals being constituted by real samples and fictitious samples. The fictitious values $a_{ij}$ are for example chosen so as to extrapolate the really sampled signals $A_i$, as shown in FIG. 4 with respect to the signals at frequencies F0 and F1. In this case, the fictitious values $a_{ij}$ are not simply predetermined and memorized, but obtained by computation, for example according to a known method of extrapolation.

FIG. 4 shows an exemplary view of two signals 41, 42 pertaining respectively to the frequencies F0 and F1 extrapolated according to the fictitious values $a_{ij}$. In this case it is for example a sinusoidal interpolation obtained after fictitious holding operations and after filtering. Black dots 43 represent the values of the actually sampled signals while blank dots 44 represents the fictitious samples. With regard to the signal 41 at the frequency F0, the sampling done at the instant $t_0$ gives the previous value $A_0$. With regard to the signal 42 at the frequency F1, the sampling done at the instant $t_0+T_e$ gives the previous value $A_1$. The extrapolation of the signals by the fictitious samples $a_{ij}$ 44 is for example obtained by a computer on the basis of the knowledge of the periods of the signals as well as their maximum values or non-maximum values estimated on the basis of prior recurrences. In particular, a linear interpolation is possible from two immediately preceding signals.

From FIGS. 3 and 4, and whatever the values of the fictitious samples $a_{ij}$, in particular whether they are arbitrarily chosen as being equal to zero or to another value that is constant or not, it follows that, in a receiver according to the invention, interpolation means, on the basis of the real samples $A_i$ and the fictitious samples $a_{ij}$, deliver signals at the frequencies F1, F2, F3, F4, F5 which appear to have been sent and received simultaneously and sampled synchronously. In particular, the Doppler frequency of the signals received then appears to be no longer correlated with the results of the fast Fourier transform computations giving the phase rotation $\Delta\phi$, and consequently the measurements of distances are no longer disturbed.

Figure 5:
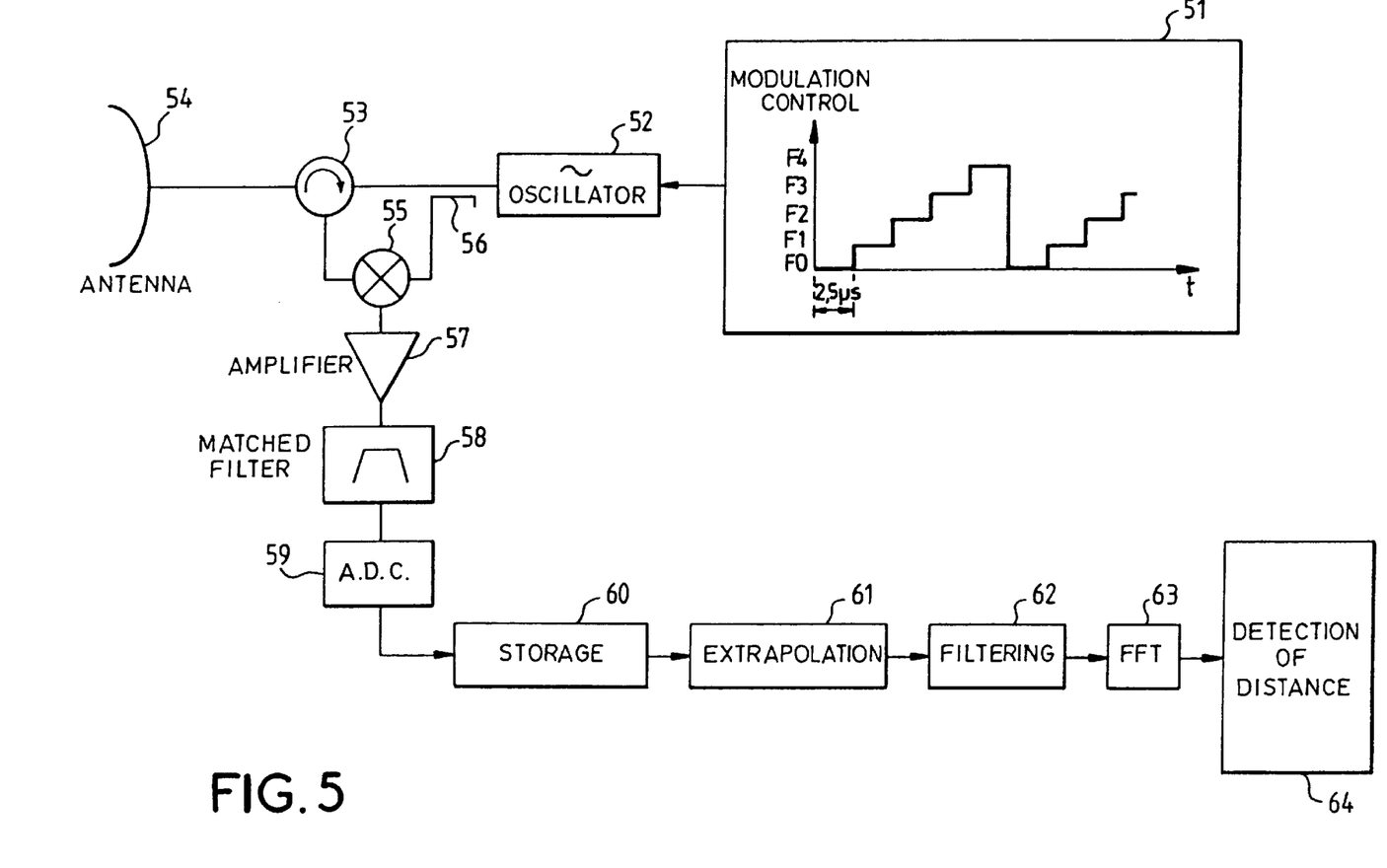
FIG. 5 is a block diagram of a frequency-shift-keying continuous-wave radar comprising a receiver according to the invention.

FIG. 5 gives a view, in a block diagram, of a frequency-shift-keying continuous-wave radar. The wave is sent in frames of five frequencies, in accordance for example with the shape shown in FIG. 1. This radar uses a digital receiver according to the invention. This receiver is for example of the homodyne type.

Modulation control means 51 control a local oscillator 52 so that this oscillator delivers five frequencies, for example according to the relationships (1) to (5). This oscillator 52 is connected to a circulator 53 to give. Through this circulator and amplification means that are not shown, the oscillator 52 gives the transmission wave to an antenna 54. A signal received by this antenna is given through the circulator 53 to a mixer 55. The receiver according to the invention comprises for example at least this mixer 55, an amplifier 57, a matched filter 58, an analog-digital converter 59, storage means 60 and interpolation means 61 and filtering means 62. These means 62 deliver the signals to a fast Fourier transform FFT computation means 63 whose results are analyzed by computation means 64 to estimate the distances for example according to the previous relationship (6) or according to other more complex relationships making it possible in particular to remove ambiguities on the estimated distances.

With regard to the digital receiver, the mixer 55 furthermore receives, through a coupler 56, the output signal from the oscillator 52. The output signal from the mixer 55 is amplified for example by the amplifier 57 whose output is connected to the input of the matched filter 58. This matched filter is used in particular to limit the passband to the output signals. As it happens, since the signals are sampled at the sampling frequency $F_e$, the cutoff frequency of the filter is for example smaller than or equal to $F_e/2$. The matched filter 58 is constituted for example by an RC circuit, i.e. simply by a resistor and a capacitor. The output of this filter is connected to the input of the analog-digital converter 59. This converter 59 samples the received, amplified and filtered reception signal and then converts it digitally. The sampling is for example done at the frequency of 400 kHz so as to generate five digital signals at the frequency of 80 kHz corresponding to the five transmission frequencies of the radar in the case where each transmission slot has a duration of 2.5 μs. There is then one sampling operation per transmission slot. The converter 59 is followed by five reception channels, one channel being associated with one transmission frequency. These reception channels are contained in the storage means 60, extrapolation means 61 and filtering means 62 presented in greater detail in FIG. 6.

Figure 6:
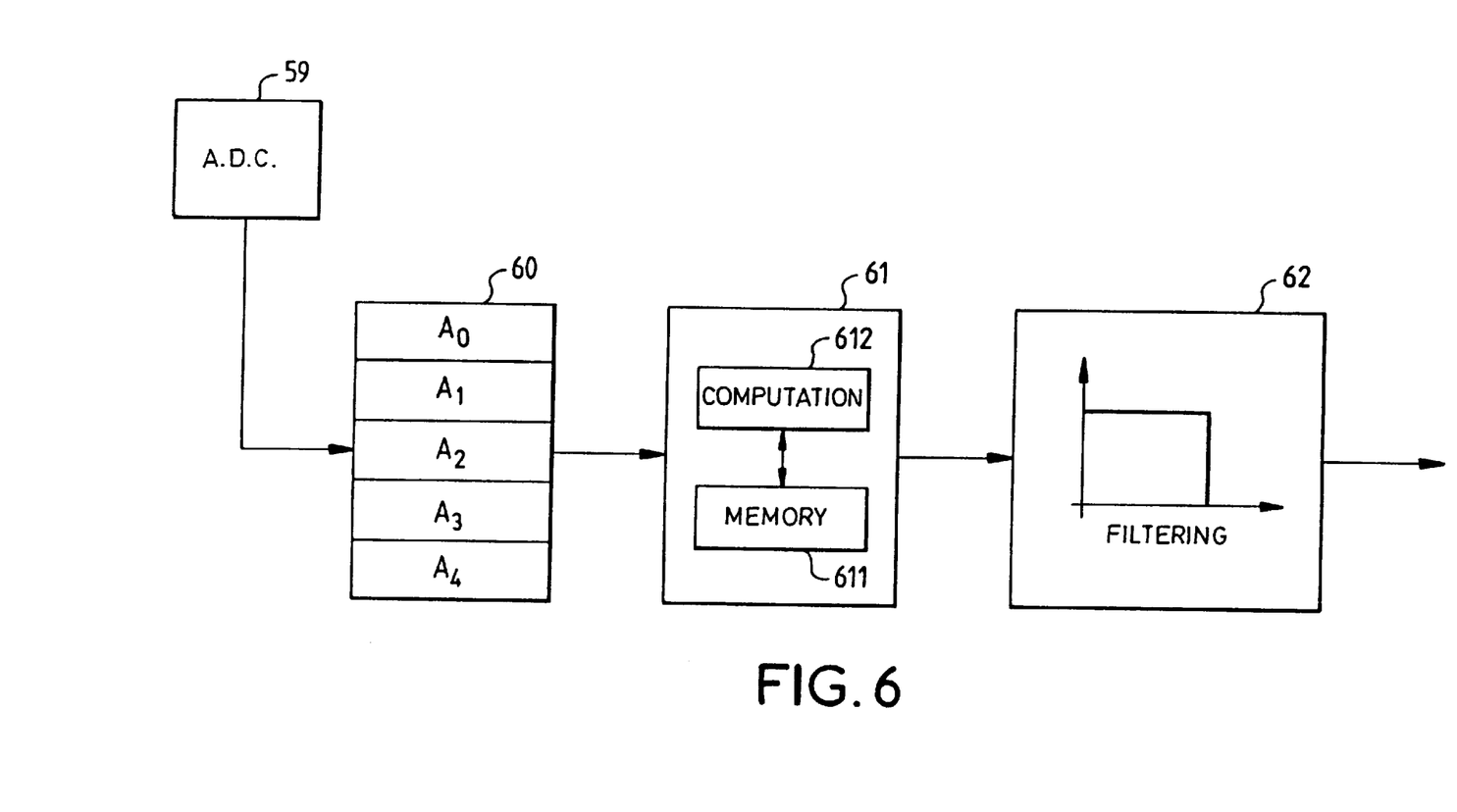
FIG. 6 shows means for the storage of real samples, extrapolation means and filtering means.

FIG. 6 gives a detailed view, through a block diagram, of the storage of the real samples $A_0$, $A_1$, $A_2$, $A_3$, $A_4$, the generation of the fictitious samples or extrapolation and the filtering of the extrapolated signals. The analog-digital converter 59 is activated for example at the sampling instants $t_0+T_e$, $t_0+2T_e$, $t_0+3T_e$, $t_0+4T_e$, $t_0+5T_e$, $t_0+6T_e$ . . . to convert the signals received at the different frequencies F0, F1, F2, F3, F4, F5. The converter comprises for example an integrated holding device, the holding of the signal before conversion thus corresponding to the sampling instant. The output of the analog-digital converter 59 gives the values of the real samples $A_0$, $A_1$, $A_2$, $A_3$, $A_4$, which are each stored in a location of the storage means 60 that is dedicated to them. These storage means are for example a reserved zone of random-access memory RAM. The control of the converter 59 as well as the storage of the samples in the memory 60 is done for example by a microprocessor that is not shown. This microprocessor can also be used for other tasks. The real samples contained in the storage means 60 are subsequently taken into account by the extrapolation means 61. An extrapolation is done at each radar recurrence, namely for each reception corresponding to a frame of transmission at the five frequencies used, when the radar uses five of them. The extrapolation means comprise a memory 611 to store the extrapolation values pertaining to the fictitious samples. In the event of a linear extrapolation for example, random-access memory permits the storage of the prior sample. Computation means 612 constitute the extrapolated signals as shown in FIG. 3. The extrapolated signals are then discrete. The filtering means 62 which follow the interpolation means, and which are of the low-pass type, then make it possible to provide a continuous signal, for example of the type shown in FIG. 4, the cut-off frequency of these filtering means being smaller than or equal to $F_e/2$ where $F_e=1/T_e$ is the sampling frequency. The filtering means 62 achieve for example a digital filtering operation whose coefficients are defined in a manner known to those skilled in the art, in particular to obtain the above low-pass filter. Preferably, the filter is non-recursive. This makes it possible in particular to adapt it only to the output signals and not to the sampling frequency of the converter 59. Indeed, a filter of this kind, whose transfer function does not have any denominator, does not use intermediate values given at input. For example, if the fictitious samples $a_{ij}$ should all be equal to zero, the filter 62 enables the extrapolation of these zero values in limiting the passband to the defined output frequency.

In addition to its economic aspect, one advantage of the invention is that it implies an "oversampling" of the received signal. In other words, if, for example, the radar uses five frequencies, the samples given to the filter 62 are at the sampling frequency and not at ⅕ of this frequency as in the case where only the real samples are given. This improves the filtering since the filter can thus work at a higher order. The invention is furthermore simple to implement.

Figure 7:
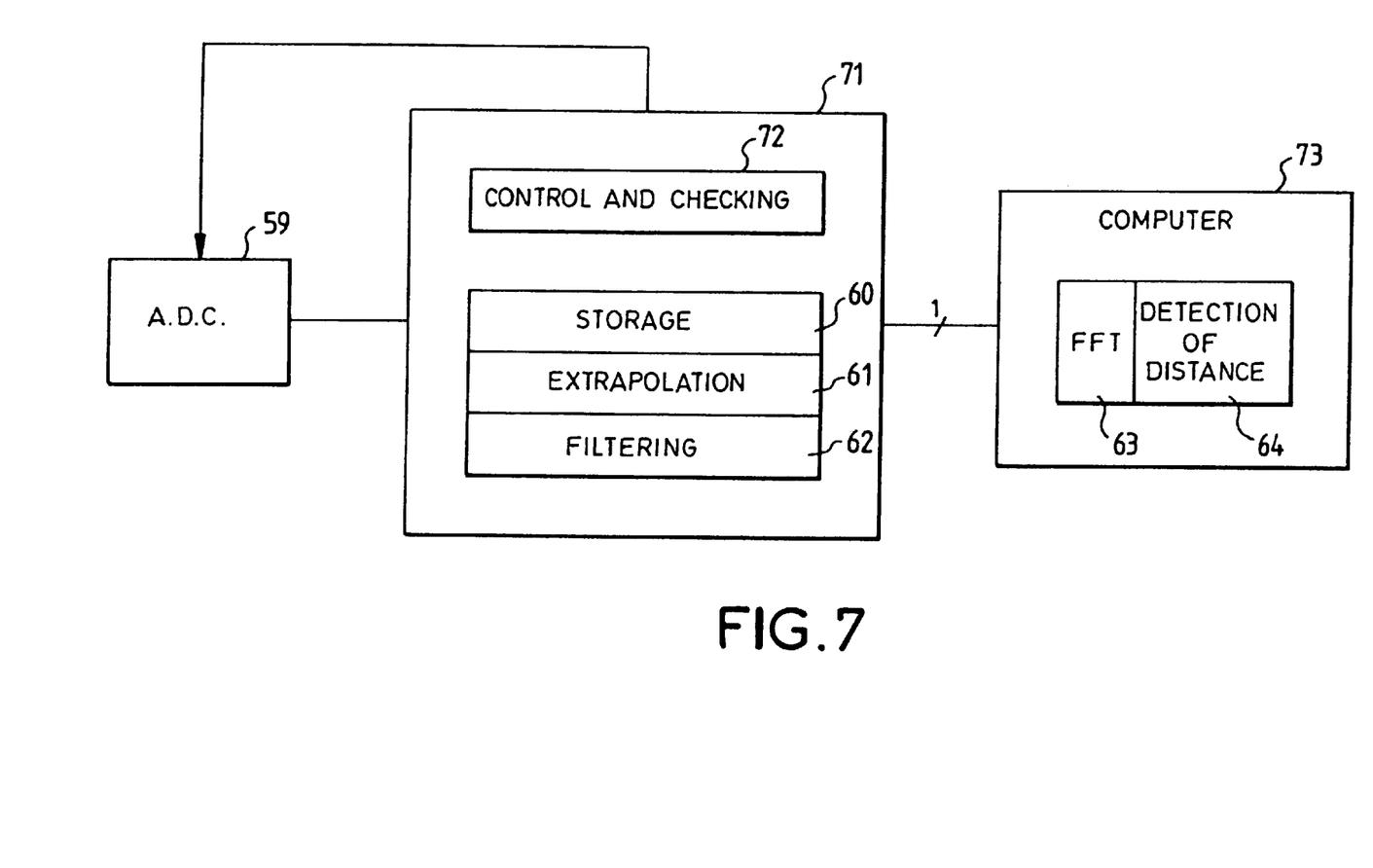
FIG. 7 is an illustration of possible embodiments of components of a receiver according to the invention.

In particular, as shown in FIG. 7, the storage means 60, the extrapolation means 61 and the filtering means 62 may be made in one and same circuit 71. This circuit 71 may for example be a specific component known in particular to those skilled in the art as an ASIC. This circuit may furthermore be based on microprocessors, programmable components, sequencers, or wired logic systems. Since the input of the circuit 71 is connected to the output of the analog-digital converter 59, it may furthermore comprise circuits 72 for controlling and checking this converter 59.

These circuits 72 may especially comprise a clock designed to generate the sampling frequency of the reception circuits. Since the output filter 62 is digital, it may give its output signals, for example in the form of a series link, to a computer 73 which includes the FFT computation means 63 and the distance detection means 64. These distance detection means then give values of distances to processing means that are not shown. This will be done, for example in the case of an ACC application, in order to give an alarm signal to a driver or actuate the speed control devices of an automobile. Since the receiver according to the invention is in fact programmable, especially as regards the interpolation means 61 and filtering means 62, it is particularly not limited by the number of transmission frequencies used in a frequency-shift-keying radar.

The invention makes it possible especially, through the use of a non-recursive filtering operation 62, to make the rate of the output frame of the receiver and the sampling frequency independent of each other. In particular, this desynchronization is done during the filtering 62. It is thus possible for example to take account only of the values filtered every 20 µs instead of every 2.5 µs which is the sampling period. In other words, the instant of computation of the result of the filtering may be chosen freely, for example it may be set at every 20 µs, for a Doppler band of 25 kHz. The invention also enables the reduction of the dynamic range of the encoders in as much as the signal-to-noise ratio is smaller than in a standard approach, thanks to the additional fictitious samples. Thus, a 12-bit encoder may be used instead of a 16-bit encoder. This point gives an initial economic balance sheet of the invention since, for example in the case of use at five frequencies, one 12-bit encoder working at 400 kHz can replace five 16-bit encoders working 50 kHz. An encoder of this kind associated with the electronic assembly of the reception channel is less costly than the other five encoders associated with the electronic system of the five reception channels, all the more so as the wiring is substantially reduced. The invention furthermore facilitates the calibration or self-calibration of the receiver, especially because there is no encoding channel. Finally, the digital circuits prevent temporal drifts.

What is claimed is:

1. A receiver for a frequency-shift-keying continuous-wave radar transmitting in several frequencies and comprising several corresponding reception channels for receiving signals, wherein said receiver comprises:

sampling means for taking real samples of the signals in each reception channel; and extrapolation means for producing fictitious samples synchronous with the real samples, wherein reception signals are formed out of the real samples and the fictitious samples.

2. A receiver according to claim 1, wherein the fictitious samples have a zero value.

3. A receiver according to claim 1, wherein the fictitious samples are equal to a last sampled real value.

4. A receiver according to claim 1, wherein the fictitious samples are obtained by a linear extrapolation of the real samples.

5. A receiver according to claim 1, further comprising filtering means at an output of the extrapolation means for filtering the fictitious samples.

6. A receiver according to claim 5, wherein the filtering means are digital.

7. A receiver according to claim 6, wherein the filtering means is non-recursive.

8. A receiver according to claim 1, wherein an extrapolation of the real samples by the fictitious samples is done at each radar recurrence.

9. A receiver according to claim 1, wherein the sampling means are contained in an analog-digital converter.

10. A receiver according to claim 1, further comprising, upline from the sampling means, a matched filter whose cut-off frequency is smaller than or equal to a sampling frequency divided by two.

11. A receiver according to claim 1, wherein the radar sends and receives in five frequencies, F0, F1, F2, F3, F4.

12. A receiver according to claim 11, wherein the five frequencies F0, F1, F2, F3, F4 verify the following relationships:

$$F0=F+k_0v$$

$$F1=F+k_1v$$

$$F2=F+k_2v$$

$$F3=F+k_3v$$

$$F4=F+k_4v$$

where F is any frequency in the frequency band of use of the radar, the coefficients $k_i$ are five different integers, and v represents a given frequency.

13. A receiver according to claim 11, wherein the frequency band of the radar ranges from 76 to 77 GHz.

14. A receiver according to claim 11, equipping an automobile vehicle.

15. A receiver according to claim 1, that is a homodyne type receiver.

16. A method of processing a frequency-shift-keyed continuous-wave signal received in a radar, comprising:

receiving a return signal in reception channels respectively corresponding to a plurality of transmitted frequencies;

frequency-shift-keying the return signal;

sampling real samples of the return signal in each of the reception channels;

extrapolating the real samples to produce fictitious samples synchronous with the real samples; and forming reception signals out of said real samples and said fictitious samples.

17. A method according to claim 16, wherein the extrapolating step results in a plurality of fictitious samples for each pair of said real samples.

18. A method according to claim 17, further comprising:

performing a Fourier transformation following the extrapolating step.

19. A receiver for a frequency-shift-keying continuous-wave radar transmitting in several frequencies and including several corresponding reception channels for receiving channels, said receiver comprising:

a sampling mechanism configured to obtain real samples of the signals in each reception channel; and an extrapolation mechanism configured to produce fictitious samples synchronous with the real samples, wherein reception signals are formed out of the real samples and the fictitious samples.

20. A receiver according to claim 19, wherein the fictitious samples have a zero value.

21. A receiver according to claim 19, wherein the fictitious samples are equal to a last sampled real value.

22. A receiver according to claim 19, wherein the fictitious samples are obtained by a linear extrapolation of the real samples.

23. A receiver according to claim 19, further comprising a filter at an output of the extrapolation mechanism and configured to filter the fictitious signals.

24. A receiver according to claim 23, wherein the filter comprises a digital filter.

25. A receiver according to claim 24, wherein the filter is nonrecursive.

26. A receiver according to claim 19, wherein an extrapolation of the real samples by the fictitious samples is done at each radar recurrence.

27. A receiver according to claim 19, wherein the sampling mechanism is contained in an analog-digital converter.

28. A receiver according to claim 19, further comprising, upline from the sampling mechanism, a matched filter whose cut-off frequency is smaller than or equal to a sampling frequency divided by two.

29. A receiver according to claim 19, wherein the radar sends and receives in five frequencies, F0, F1, F2, F3, F4.

30. A receiver according to claim 29, wherein the five frequencies F0, F1, F2, F3, F4 verify the following relationships:

$$F0 = F + k_0 v$$
$$F1 = F + k_1 v$$
$$F2 = F + k_2 v$$
$$F3 = F + k_3 v$$
$$F4 = F + k_4 v$$

where F is any frequency in the frequency band of the radar, the coefficients $k_i$ are five different integers, and v represents a given frequency.

31. A receiver according to claim 29, wherein the frequency band of the radar ranges from 76 to 77 GHz.

32. A receiver according to claim 29, wherein the receiver is installed in an automobile.

33. A receiver according to claim 19, wherein the receiver comprises a homodyne type receiver.

* * * * *